(12) United States Patent
Taroura et al.

(10) Patent No.: US 11,125,703 B2
(45) Date of Patent: Sep. 21, 2021

(54) RADIATION DETECTION DEVICE AND COMPUTER PROGRAM

(71) Applicant: HORIBA, Ltd., Kyoto (JP)

(72) Inventors: Azusa Taroura, Kyoto (JP); Kusuo Ueno, Kyoto (JP)

(73) Assignee: HORIBA, LTD., Kyoto (JP)

( * ) Notice: Subject to any disclaimer, the term of this patent is extended or adjusted under 35 U.S.C. 154(b) by 0 days.

(21) Appl. No.: 16/468,454

(22) PCT Filed: Nov. 27, 2017

(86) PCT No.: PCT/JP2017/042325
§ 371 (c)(1),
(2) Date: Jun. 11, 2019

(87) PCT Pub. No.: WO2018/110254
PCT Pub. Date: Jun. 21, 2018

(65) Prior Publication Data
US 2019/0331618 A1    Oct. 31, 2019

(30) Foreign Application Priority Data

Dec. 15, 2016 (JP) .............................. JP2016-242914

(51) Int. Cl.
*G01N 23/2204* (2018.01)
*G01N 23/223* (2006.01)

(52) U.S. Cl.
CPC ....... *G01N 23/2204* (2013.01); *G01N 23/223* (2013.01); *G01N 2223/321* (2013.01)

(58) Field of Classification Search
CPC ............. G01N 23/2204; G01N 23/223; G01N 2223/321
See application file for complete search history.

(56) References Cited

U.S. PATENT DOCUMENTS

| 4,317,036 A | * | 2/1982 | Wang | G01N 23/223 378/146 |
| 2007/0248215 A1 | * | 10/2007 | Ohshima | G01N 23/223 378/143 |

(Continued)

FOREIGN PATENT DOCUMENTS

| JP | H05118999 A | 5/1993 |
| JP | H07260714 A | 10/1995 |

(Continued)

OTHER PUBLICATIONS

International Search Report dated Feb. 27, 2018 for PCT/JP2017/042325 and English translation.

(Continued)

*Primary Examiner* — David P Porta
*Assistant Examiner* — Mamadou Faye
(74) *Attorney, Agent, or Firm* — Lucas & Mercanti, LLP

(57) ABSTRACT

The radiation detection device according to the present invention comprises: a sample holding unit; an irradiation unit configured to irradiate a sample held by the sample holding unit with radioactive rays; a detection unit configured to detect radioactive rays generated from the sample; a distance calculation unit configured to calculate a distance from a predetermined base point to an irradiated part, which is to be irradiated with radioactive rays, of the sample held by the sample holding unit; a size specification unit configured to specify a size of the irradiated part on the sample based on the calculated distance; and a display unit configured to display the specified size of the irradiated part.

11 Claims, 9 Drawing Sheets

(56) References Cited

U.S. PATENT DOCUMENTS

| | | | |
|---|---|---|---|
| 2010/0046700 A1* | 2/2010 | Sakai | G01N 23/223 378/44 |
| 2010/0046701 A1 | 2/2010 | Matoba | |
| 2011/0051894 A1 | 3/2011 | Takahara | |
| 2012/0051507 A1 | 3/2012 | Hasegawa et al. | |
| 2013/0070069 A1* | 3/2013 | Hyde | G06F 19/00 348/65 |
| 2014/0014848 A1* | 1/2014 | Hatakeyama | H01J 37/073 250/393 |
| 2015/0185453 A1* | 7/2015 | Corwin | G01N 35/00029 348/80 |
| 2015/0268180 A1 | 9/2015 | Hirose | |
| 2017/0143429 A1* | 5/2017 | Richmond | A61B 34/20 |

FOREIGN PATENT DOCUMENTS

| | | |
|---|---|---|
| JP | 2010048727 A | 3/2010 |
| JP | 2011047898 A | 3/2011 |
| JP | 2013185986 A | 9/2013 |
| JP | 2015184041 A | 10/2015 |

OTHER PUBLICATIONS

European Patent Office, Extended European search report dated Jul. 9, 2020, which was issued in connection with the corresponding European Patent Application No. 17881636.9 (5 pages).

* cited by examiner

RADIATION DETECTION DEVICE AND COMPUTER PROGRAM

CROSS REFERENCE TO RELATED APPLICATION

This Application is a 371 of PCT/JP2017/042325 filed on Nov. 27, 2017, which, in turn, claimed the priority of Japanese Patent Application No. 2016-242914 filed on Dec. 15, 2016, both applications are incorporated herein by reference.

FIELD

The present invention relates to a radiation detection device configured to perform observation of a sample, irradiation of a sample with radioactive rays, and detection of radioactive rays generated from a sample, and to a computer program.

BACKGROUND

An X-ray analysis is a method of irradiating a sample with radioactive rays such as electron rays or X rays, detecting characteristic X rays generated from the sample, and analyzing components contained in the sample from a characteristic X-ray spectrum. An example of an X-ray analysis is a fluorescent X-ray analysis that uses X rays as radioactive rays to be used for irradiation of the sample.

An X-ray detection device to be used for an X-ray analysis is provided with a radiation source configured to irradiate a sample with radioactive rays, and a detection unit configured to detect characteristic X rays generated from the sample. The X-ray detection device is also provided with an optical microscope to be used for observation of a sample. Japanese Patent Application Laid-Open No. 2010-48727 discloses an X-ray detection device provided with an optical microscope.

SUMMARY

An X-ray detection device for irradiating a sample with radioactive rays is configured to converge radioactive rays on the surface of the sample. The size of an irradiated part, which is to be irradiated with radioactive rays, on the surface of the sample is generally minimized at a focal position where radioactive rays are converged, and is enlarged with the distance from the focal position. Generally, an X-ray detection device is set in a manner such that a sample is disposed at a focal position where radioactive rays are converged. However, how large the irradiated part actually is, or how long the distance between the surface of the sample and the focal position where the radioactive rays are converged is, is unclear. Especially regarding a sample having an uneven surface, the size of the irradiated part depends on the position to be irradiated with radioactive rays, and it is difficult to grasp the size of the irradiated part.

The present disclosure has been made in view of such problems, and an object thereof is to provide a radiation detection device and a computer program that enable to check the actual size of an irradiated part.

A radiation detection device according to an aspect of the present disclosure includes a sample holding unit, an irradiation unit configured to irradiate a sample held by the sample holding unit with radioactive rays, and a detection unit configured to detect radioactive rays generated from the sample. The radiation detection device is characterized by comprising: a distance calculation unit configured to calculate a distance from a predetermined base point to an irradiated part, which is to be irradiated with radioactive rays, of the sample held by the sample holding unit; a size specification unit configured to specify a size of the irradiated part on the sample based on the calculated distance; and a display unit configured to display the specified size of the irradiated part.

The radiation detection device according to an aspect of the present disclosure is characterized by further comprising an optical microscope to be used for observation of the sample, wherein the display unit displays an observation image of the sample obtained with the optical microscope and an image indicating an extent of the irradiated part on the sample with one over the other.

The radiation detection device according to an aspect of the present disclosure is characterized by further comprising an adjustment unit configured to adjust a focal position of the optical microscope in a manner such that a focus is set in the irradiated part, wherein the distance calculation unit calculates the distance from the predetermined base point to the irradiated part depending on a distance from a standard position to the adjusted focal position.

The radiation detection device according to an aspect of the present disclosure is characterized by further comprising a distance changing unit configured to change a distance from the predetermined base point to the irradiated part, wherein the display unit displays the distance calculated by the distance calculation unit, and such an optimum distance from the predetermined base point to the irradiated part that the size of the irradiated part is minimized.

The radiation detection device according to an aspect of the present disclosure is characterized by further comprising a warning unit configured to output a warning in a case where the distance calculated by the distance calculation unit is equal to or smaller than a preset lower limit.

In the radiation detection device according to an aspect of the present disclosure, the irradiation unit includes a plurality of convergence units configured to converge radioactive rays to be used for irradiation of a sample into different diameters, and the size specification unit specifies the size of the irradiated part according to one convergence unit selected from the plurality of convergence units.

The radiation detection device according to an aspect of the present disclosure is characterized by further comprising: an irradiation position changing unit configured to sequentially change a position of the irradiated part on the sample; and a generation unit configured to generate radiation distribution in which a detection result of radioactive rays and a size of the irradiated part are associated with each part on the sample.

A computer program according to an aspect of the present disclosure is capable of causing a computer to control a radiation detection device including an irradiation unit configured to irradiate a sample with radioactive rays, a detection unit configured to detect radioactive rays generated from the sample, an optical microscope to be used for observation of the sample, and a display unit. The computer program is characterized by being capable of causing a computer to execute processing comprising:

a step of calculating a distance from a predetermined base point in the radiation detection device to an irradiated part, which is to be irradiated with radioactive rays, of a sample depending on a distance from a standard position to a focal position of the optical microscope having a focus set in the irradiated part; a step of specifying a size of the irradiated part on the sample based on the calculated distance; and a step of causing the display unit to display the specified size of the irradiated part.

A radiation detection device in the present disclosure irradiates a sample with radioactive rays and detects radioactive rays generated from the sample. The radiation detection device calculates the distance from a predetermined base point to an irradiated part, which is to be irradiated with radioactive rays, of the sample, specifies the size of the irradiated part on the sample based on the calculated distance, and displays the specified size of the irradiated part. Since spreading of radioactive rays to be used for irradiation of a sample depends on the distance along the irradiation direction, it is possible to specify the size of the irradiated part according to the distance. Since the specified size of the irradiated part is displayed, the user can check the size of the irradiated part.

Moreover, a radiation detection device in the present disclosure is provided with an optical microscope to be used for observation of a sample. The radiation detection device displays an observation image of a sample obtained by the optical microscope and an image indicating the extent of an irradiated part on the sample with one over the other. Which part of the sample is specifically irradiated with radioactive rays is displayed.

Moreover, a radiation detection device in the present disclosure adjusts the focal position of the optical microscope in a manner such that the focus of the optical microscope is set in the irradiated part of the sample, and calculates the distance from the predetermined base point to the irradiated part of the sample according to the distance from the standard position to the focal position. When a distance from the predetermined base point to the standard position is known in a case where the focus accords with the standard position, it is possible to calculate the distance from the predetermined base point to the irradiated part of the sample according to the distance from the standard position to the focal position.

Moreover, a radiation detection device in the present disclosure can change the distance from the predetermined base point to the irradiated part of the sample, and displays the distance from the predetermined base point to the irradiated part of the sample, and an optimum distance that minimizes the irradiated part. This enables to compare the current position of the sample and the optimum position.

Moreover, a radiation detection device in the present disclosure warns that the calculated distance is equal to or smaller than a lower limit. This gives a warning that the sample is located too close to another component of the radiation detection device.

Moreover, a radiation detection device in the present disclosure converges radioactive rays and irradiates the sample. The radiation detection device is provided with a plurality of convergence units having different radiation convergence diameters and specifies the size of the irradiated part according to a convergence unit. Since the size of the irradiated part changes as the radiation convergence diameter is changed, the size of the irradiated part is specified according to a convergence unit to be used for irradiation.

Moreover, a radiation detection device in the present disclosure sequentially changes the position of the irradiated part on the sample, and generates radiation distribution in which the detection result of radioactive rays and the size of the irradiated part are associated with each part on the sample. This enables to obtain a radiation analysis result for each part on the sample and to obtain the size of the extent where each part is irradiated with radioactive rays.

In the present disclosure, a radiation detection device displays the size of an irradiated part, which is to be irradiated with radioactive rays, on a sample, and the user can check the actual size of the irradiated part. Accordingly, an aspect of the present disclosure exhibits excellent effects that the user can grasp the actual size of the irradiated part and adjust the position of the sample in a manner such that the size of the irradiated part becomes a proper value.

The above and further objects and features will more fully be apparent from the following detailed description with accompanying drawings.

DETAILED DESCRIPTION

The following description will give a concrete explanation on the present disclosure with reference to the drawings illustrating some embodiments thereof.

Embodiment 1

Figure 1:
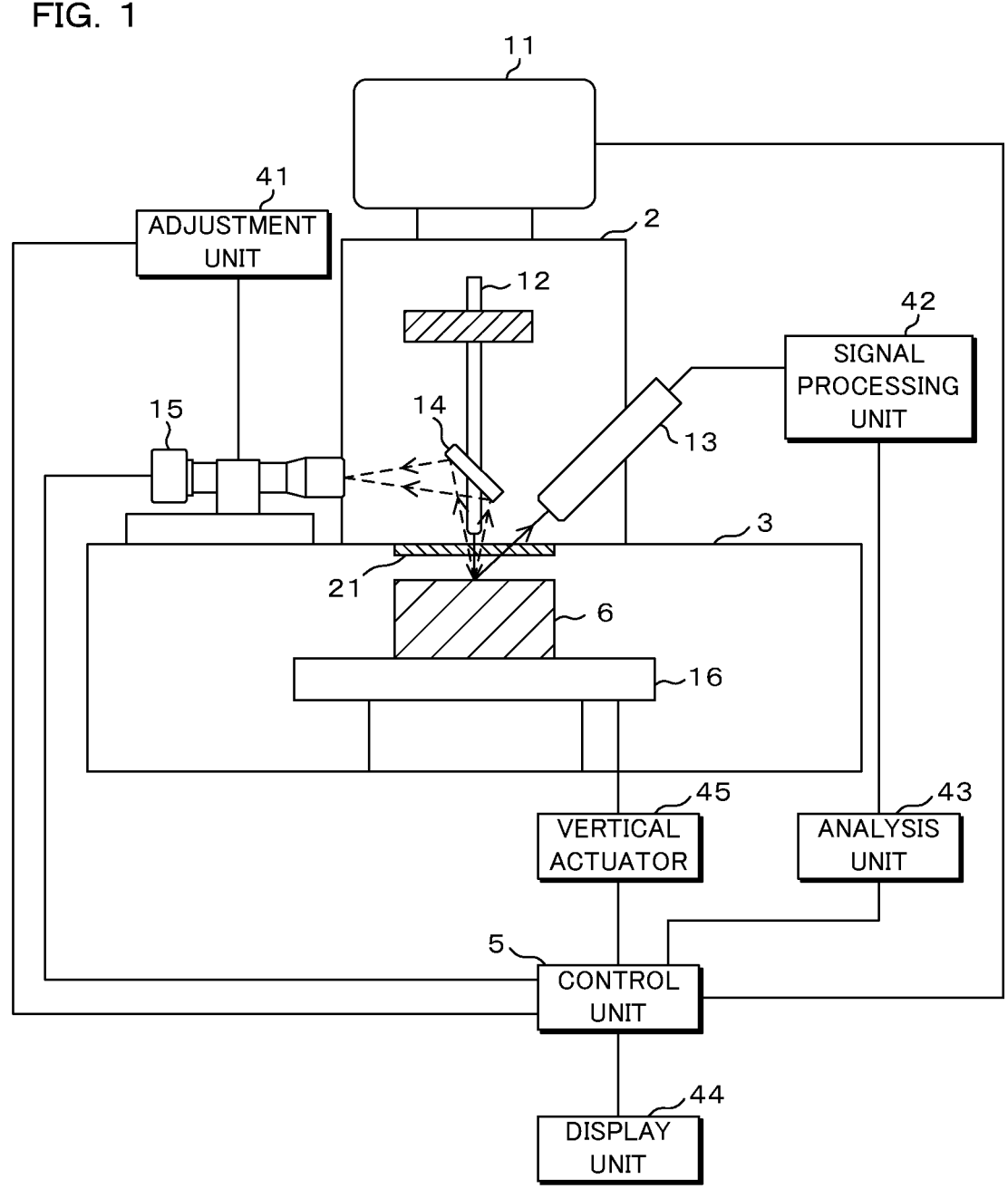
FIG. 1 is a block diagram illustrating the configuration of an X-ray detection device according to Embodiment 1.

FIG. 1 is a block diagram illustrating the configuration of an X-ray detection device according to Embodiment 1. The X-ray detection device is a fluorescent X-ray analysis device and corresponds to a radiation detection device. The X-ray detection device is provided with a sample stage 16 on which a sample 6 is to be mounted, an X-ray source 11 configured to emit X rays, an X-ray optical element 12 configured to converge X rays emitted from the X-ray source 11 and irradiate the sample 6 with the X rays, and a detection unit 13 configured to detect X rays. The sample stage 16 corresponds to a sample holding unit. The sample holding unit may have an aspect to hold a sample in a method other than mounting. The X-ray source 11 is an X-ray tube, for example. The X-ray optical element 12 is, for example, a mono-capillary lens that uses an X-ray conduit tube configured to guide entered X rays while reflecting the X rays inside thereof, or a poly-capillary lens that uses a plurality of X-ray conduit tubes. X rays emitted from the X-ray source 11 enter the X-ray optical element 12, and the X-ray optical element 12 converges the X rays. The X rays converged by the X-ray optical element 12 are used for irradiation of the sample 6 mounted on the sample stage 16. The X-ray source 11 and the X-ray optical element 12 correspond to an irradiation unit. Fluorescent X rays are generated at a part, which is irradiated with X rays, of the sample 6. The detection unit 13 detects fluorescent X rays generated from the sample 6 and outputs a signal proportional to the energy of the detected fluorescent X rays. In FIG. 1, an X ray to be used for irradiation of the sample 6 and a fluorescent X ray are each drawn with a solid arrow.

The X-ray detection device is also provided with an unillustrated light source configured to light the sample 6, a mirror 14, and an optical microscope 15. Light that lights the sample 6 is reflected at the sample 6. The mirror 14 reflects the light reflected at the sample 6 and causes the light to enter the optical microscope 15. In FIG. 1, light is drawn with broken arrows. The optical microscope 15 has an image sensor. The optical microscope 15 detects entered light, and photographs the sample 6. The focus of the optical microscope 15 is fixed. That is, the distance from the optical microscope 15 to the focus along the optical axis is constant. The optical microscope 15 can change the focal position in the X-ray detection device by moving. It is to be noted that the optical microscope 15 may have an aspect that includes an optical system and can change the focal position by adjusting the optical system. The X-ray detection device may be further provided with an optical system such as a lens.

The X-ray detection device is also provided with a vacuum chamber 2 and a sample chamber 3. The vacuum chamber 2 and the sample chamber 3 are coupled with each other, and the vacuum chamber 2 is disposed above the sample chamber 3. The X-ray optical element 12, the detection unit 13, and the mirror 14 are each disposed in the vacuum chamber 2 at least partially. A part or the whole of each of the X-ray source 11 and the optical microscope 15 may be disposed in the vacuum chamber 2 or may be disposed outside the vacuum chamber 2. The sample stage 16 is disposed in the sample chamber 3. A sample 6 mounted on the sample stage 16 is disposed in the sample chamber 3.

A window portion 21 is provided at the boundary between the vacuum chamber 2 and the sample chamber 3. The window portion 21 is tabular and includes a part of the bottom face of the vacuum chamber 2 and a part of the top face of the sample chamber 3. The X-ray optical element 12 is disposed with an X-ray exiting opening thereof opposed to the window portion 21. The sample stage 16 is disposed with a mounting face thereof on which the sample 6 is to be mounted opposed to the window portion 21. The sample 6 mounted on the sample stage 16 is disposed with a surface thereof opposed to the window portion 21. The window portion 21 allows passage of X rays and light. For example, the window portion 21 is transparent, and a through hole is formed to allow passage of X rays and fluorescent X rays. The mirror 14 and the optical microscope 15 are arranged in a manner such that light reflected at the sample 6 travels through the window portion 21, is reflected at the mirror 14, and enters the optical microscope 15. The X-ray source 11, the X-ray optical element 12, and the detection unit 13 are arranged in a manner such that X rays travel through the window portion 21 and are used for irradiation of the sample 6, and fluorescent X rays generated at the sample 6 travel through the window portion 21 and enter the detection unit 13. Moreover, the X-ray source 11, the X-ray optical element 12, the mirror 14, and the optical microscope 15 are arranged in a manner such that the central axis of X rays to be used for irradiation of the sample 6 substantially coincides with the optical axis of light to enter the optical microscope 15 for observation of the sample 6. Therefore, the optical microscope 15 photographs an irradiated part, which is to be irradiated with X rays, of the sample 6.

The X-ray detection device is further provided with an unillustrated air discharge unit configured to evacuate the inside of the vacuum chamber 2. The X-ray detection device may have an aspect to evacuate the inside of the vacuum chamber 2 and the sample chamber 3, or may have an aspect not to evacuate the inside of the sample chamber 3 but to evacuate the inside of the vacuum chamber 2. In an aspect in which a through hole is formed at the window portion 21 and the inside of the sample chamber 3 is not evacuated, the inside of the vacuum chamber 2 is evacuated in a state where the through hole is covered with an X-ray transmissive membrane. Irradiation with X rays and detection of fluorescent X rays are performed in a state where at least the inside of the vacuum chamber 2 is evacuated.

The detection unit 13 is connected with a signal processing unit 42 configured to process signals outputted from the detection unit 13. The signal processing unit 42 counts signals for each value outputted from the detection unit 13, and performs processing of generating a relation between the count number and the energy of detected fluorescent X rays, that is, a fluorescent X-ray spectrum. The signal processing unit 42 is connected with an analysis unit 43. The analysis unit 43 is composed of a processor configured to perform processing, and a memory configured to store data. The signal processing unit 42 outputs data, which indicates the generated spectrum, to the analysis unit 43. Data from the signal processing unit 42 is inputted to the analysis unit 43, and the analysis unit 43 makes a qualitative analysis or a quantitative analysis of elements included in the sample 6 based on a spectrum indicated by the inputted data. The optical microscope 15 is coupled with an adjustment unit 41 configured to adjust the focal position of the optical microscope 15. The adjustment unit 41 adjusts the focal position of the optical microscope 15 in the X-ray detection device by moving the optical microscope 15. The adjustment unit 41 is constituted of a stepping motor, for example. The adjustment unit 41 adjusts the focal position of the optical microscope 15 in a manner such that the focus is set on the sample 6 held on the sample stage. It is to be noted that the adjustment unit 41 may have an aspect to adjust the focal position of the optical microscope 15 by adjusting an optical system included in the optical microscope.

The X-ray detection device is also provided with a display unit 44 such as a liquid crystal display. The display unit 44 displays an image of the sample 6 photographed by the optical microscope 15. The user can observe the sample 6 by viewing the image of the sample 6 displayed on the display unit 44. The sample stage 16 is coupled with a vertical actuator 45 configured to actuate the sample stage 16 in the vertical direction, that is, a direction toward or away from the window portion 21. The vertical actuator 45 is constituted of a stepping motor, for example. The operation of the vertical actuator 45 moves the sample 6 mounted on the sample stage 16 in a direction toward or away from the window portion 21. The vertical actuator 45 corresponds to a distance changing unit. The X-ray detection device may be provided with a horizontal actuator configured to actuate the sample stage 16 in a direction crossing the X-ray irradiation direction.

Figure 2:
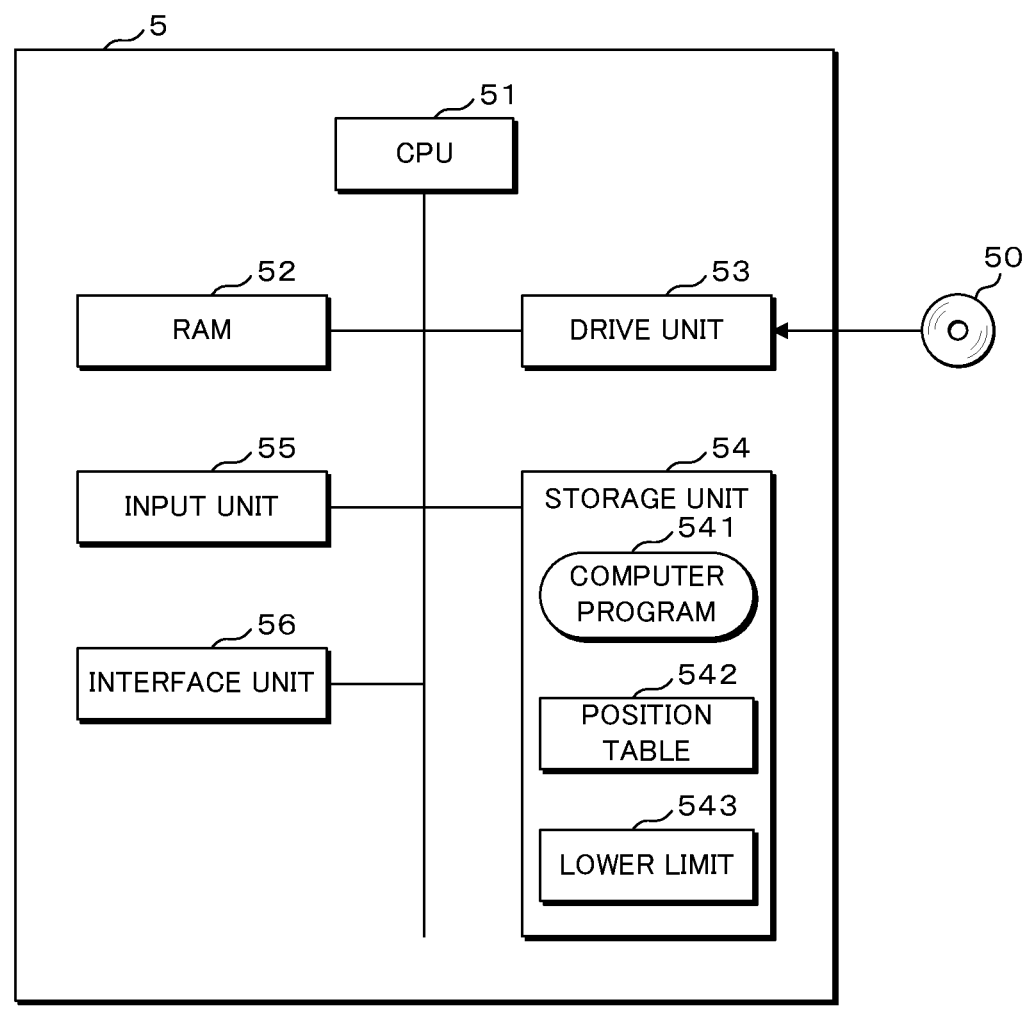
FIG. 2 is a block diagram illustrating an example of the configuration of a control unit.

The X-ray source 11, the optical microscope 15, the adjustment unit 41, the signal processing unit 42, the analysis unit 43, the display unit 44, and the vertical actuator 45 are connected with a control unit 5. The display unit 44 is connected with the optical microscope 15 via the control unit 5. FIG. 2 is a block diagram illustrating an example of the configuration of the control unit 5. The control unit 5 is constituted of a computer such as a personal computer. The control unit 5 is provided with a CPU (Central Processing Unit) 51 configured to perform processing, a RAM (Random Access Memory) 52 configured to store temporary information to be generated in operations, a drive unit 53 configured to read information from a recording medium 50 such as an optical disk, a nonvolatile storage unit 54, and an input unit 55 to be operated by the user to input information such as various processing instructions. The storage unit 54 is a hard disk, for example. The input unit 55 is a keyboard or a pointing device, for example. The control unit 5 is also provided with an interface unit 56 connected with the X-ray source 11, the adjustment unit 41, the signal processing unit 42, the analysis unit 43, the display unit 44, and the vertical actuator 45.

The CPU 51 causes the drive unit 53 to read a computer program 541 from the recording medium 50, and causes the storage unit 54 to store the read computer program 541. The CPU 51 loads the computer program 541 from the storage unit 54 to the RAM 52 as needed, and executes processing necessary for the control unit 5 according to the loaded computer program 541. It is to be noted that the control unit 5 is not necessarily provided with the drive unit 53. The computer program 541 may be downloaded from an unillustrated external server device to the control unit 5 and stored in the storage unit 54. The control unit 5 may also have an aspect in which the computer program 541 is not accepted from outside but a recording medium having the computer program 541 recorded thereon is provided inside.

The control unit 5 controls the operation of the X-ray source 11, the adjustment unit 41, the signal processing unit 42, the analysis unit 43, the display unit 44, and the vertical actuator 45. Moreover, a processing instruction from the user is inputted to the input unit 55, and the control unit 5 controls the respective components of the X-ray detection device according to the inputted processing instructions. The display unit 44 may display a fluorescent X-ray spectrum generated by the signal processing unit 42, or an analysis result obtained by the analysis unit 43. Moreover, the control unit 5 and the analysis unit 43 may be constituted of the same computer.

Figure 3:
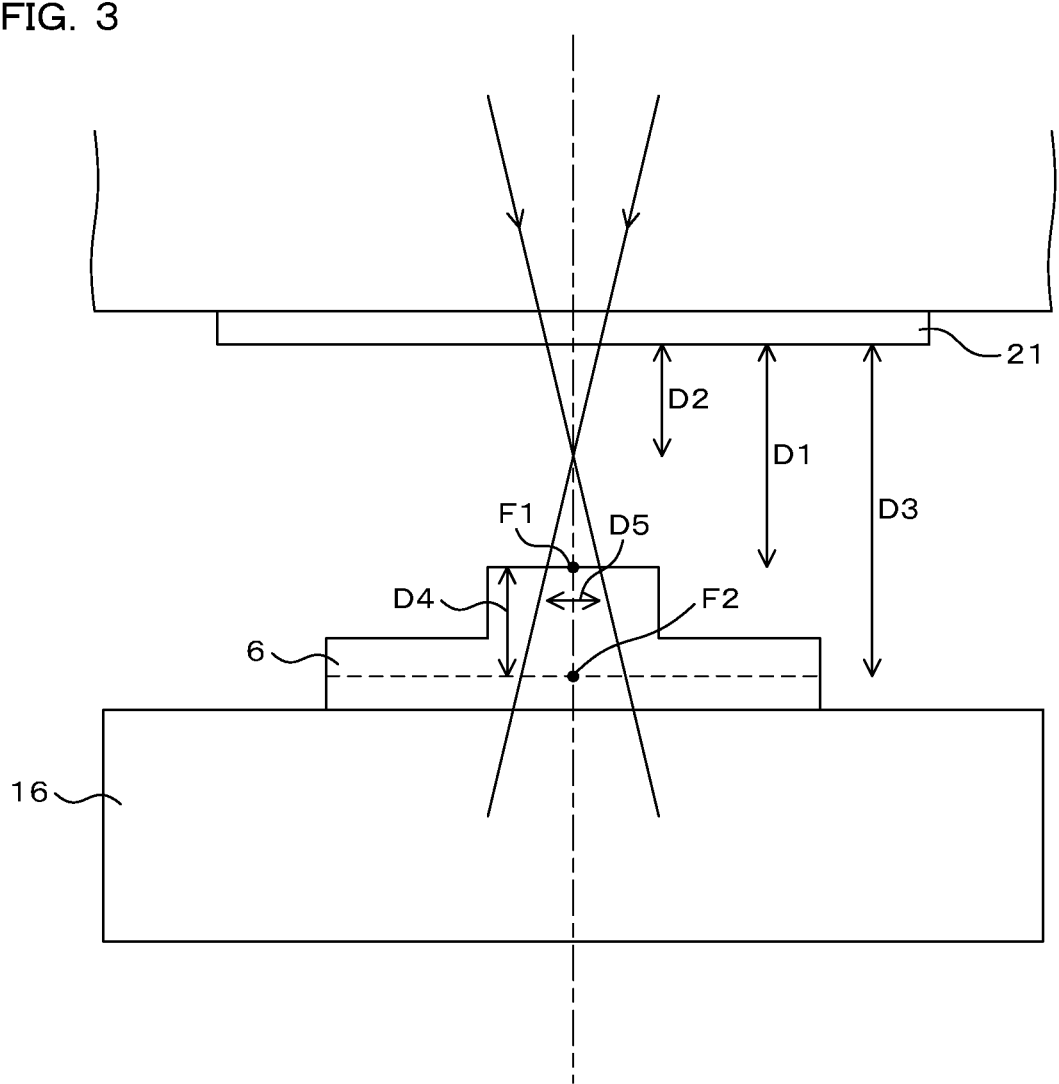
FIG. 3 is a schematic view illustrating the relation between the position of a sample and the X-ray irradiation diameter on a sample.

FIG. 3 is a schematic view illustrating the relation between the position of the sample 6 and the X-ray irradiation diameter on the sample 6. In the figure, the sample 6 mounted on the sample stage 16, and the window portion 21 are illustrated. A face of the window portion 21 opposed to the sample stage 16 will be referred to as a lower face of the window portion 21. In the example illustrated in FIG. 3, the central axis of X rays to be used for irradiation of the sample 6 coincides with the optical axis of light to enter the optical microscope 15, and the axis is drawn with a long dashed short dashed line. Moreover, X rays are drawn with solid arrows. X rays converged in the X-ray optical element 12 are once converged to the minimum and are then widened. Therefore, the irradiation diameter that is the diameter of X rays to be used for irradiation of the sample 6 varies depending on the position of the surface of the sample 6. The irradiation diameter corresponds to the size of an irradiated part on the sample 6. The base point of distance for expressing the position of the sample 6 will be referred to as a lower face of the window portion 21.

X rays are converged to the minimum and the irradiation diameter is minimized at a focal position of the X-ray optical element 12. When the irradiation diameter is the minimum value, the spatial resolution in the fluorescent X-ray analysis of the sample 6 becomes the highest value. Therefore, a fluorescent X-ray analysis is preferably performed in a state where the irradiation diameter is the minimum value. A position where X rays are converged to the minimum is the focal position of the X-ray optical element 12, which is fixed for each X-ray optical element 12. That is, an optimum distance D2, which is a distance from the lower face of the window portion 21 to a position where the irradiation diameter becomes the minimum value, is predetermined.

The sample stage 16 is actuated by the vertical actuator 45 controlled by the control unit 5, so that the position of the sample stage 16 with respect to the window portion 21 is changed, and the position of the surface of the sample 6 mounted on the sample stage 16 is also changed. A standard focal position F2, which is the focal position of the optical microscope 15 in a case where the optical microscope 15 is at a predetermined position, is at a predetermined position. In FIG. 3, a surface of the sample having the standard focal position F2 thereon is drawn with a broken line. A standard distance D3, which is a distance from the lower face of the window portion 21 to the standard focal position F2, is a predetermined distance. Generally, the standard focal position F2 is not on the surface of the actual sample 6, and the distance D1 from the lower face of the window portion 21 to the irradiated part, which is to be irradiated with X rays, of the sample 6 is different from the standard distance D3. The irradiation diameter D5 of X rays to be used for irradiation of the sample 6 becomes a value depending on to the distance D1. In a case where the sample 6 has an uneven surface, the distance D1 from the lower face of the window portion 21 to the irradiated part of the sample 6, and the irradiation diameter D5 of X rays vary depending on the position of the irradiated part on the sample 6.

The focal position F1 of the optical microscope 15 obtained when the focus is set in the actual irradiated part of the sample 6 is different from the standard focal position F2. The adjustment unit 41 can automatically adjust the focal position of the optical microscope 15 so that the focus is set in the irradiated part of the sample 6. The distance D4 from the adjusted focal position F1 to the standard focal position F2 is obtained based on the distance of movement of the optical microscope 15 by the adjustment unit 41 in the process of adjustment of the focal position. Moreover, the distance D1 from the lower face of the window portion 21 to the irradiated part of the sample 6 can be calculated based on the distance D4 from the focal position F1 to the standard focal position F2, and the standard distance D3.

Figure 4:
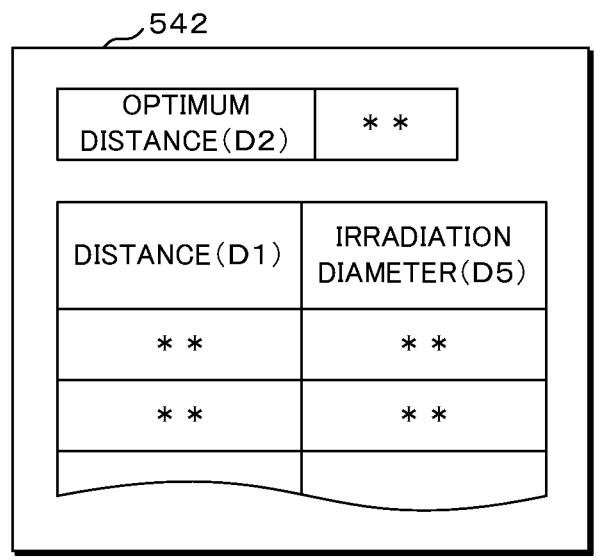
FIG. 4 is a conceptual diagram illustrating an example of the content of a position table.

The relation between the distance D1 from the lower face of the window portion 21 to the irradiated part of the sample 6 and the irradiation diameter D5 of X rays to be used for irradiation of the sample 6 is preliminarily recorded. A position table 542 that records values of the distance D1 and the irradiation diameter D5 in association with each other is stored. FIG. 4 is a conceptual diagram illustrating an example of the content of the position table 542. The value of the irradiation diameter D5 of X rays to be used for irradiation of the sample 6 is recorded in association with each value of the distance D1 from the lower face of the window portion 21 to the irradiated part of the sample 6. A value of the irradiation diameter D5 obtained when the distance D1 is each value is preliminarily measured. A standard sample is used, for example, and values of the distance D1 and irradiation diameter D5 are actually measured and recorded while changing the position of the standard sample. Moreover, a predetermined value of the optimum distance D2 is recorded in the position table 542.

Furthermore, a preset lower limit 543 of the distance from the lower face of the window portion 21 to the surface of the sample 6 is stored in the storage unit 54. In a case where the distance from the lower face of the window portion 21 to the surface of the sample 6 becomes too short, the sample 6 may possibly collide with the tip of the X-ray optical element 12 or the window portion 21. Moreover, the sample chamber 3 may possibly contract when the inside of the vacuum chamber 2 and the sample chamber 3 is evacuated, the vacuum chamber 2 may possibly come close to the sample 6, and the sample 6 may possibly collide with the tip of the X-ray optical element 12 or the window portion 21. In order to prevent such collision, a lower limit 543 is preset, and the position of the sample stage 16 is controlled in such a manner that the distance from the lower face of the window portion 21 to the surface of the sample 6 does not become equal to or smaller than the lower limit 543. The lower limit 543 may preset for each sample 6. When a lower limit 543 obtained based on the maximum height of the sample 6 is set, a convex portion of the sample 6 is prevented from colliding with the tip of the X-ray optical element 12 or the window portion 21 even in a case where the sample 6 has an uneven surface and a concave portion is irradiated with X rays.

Figure 5:
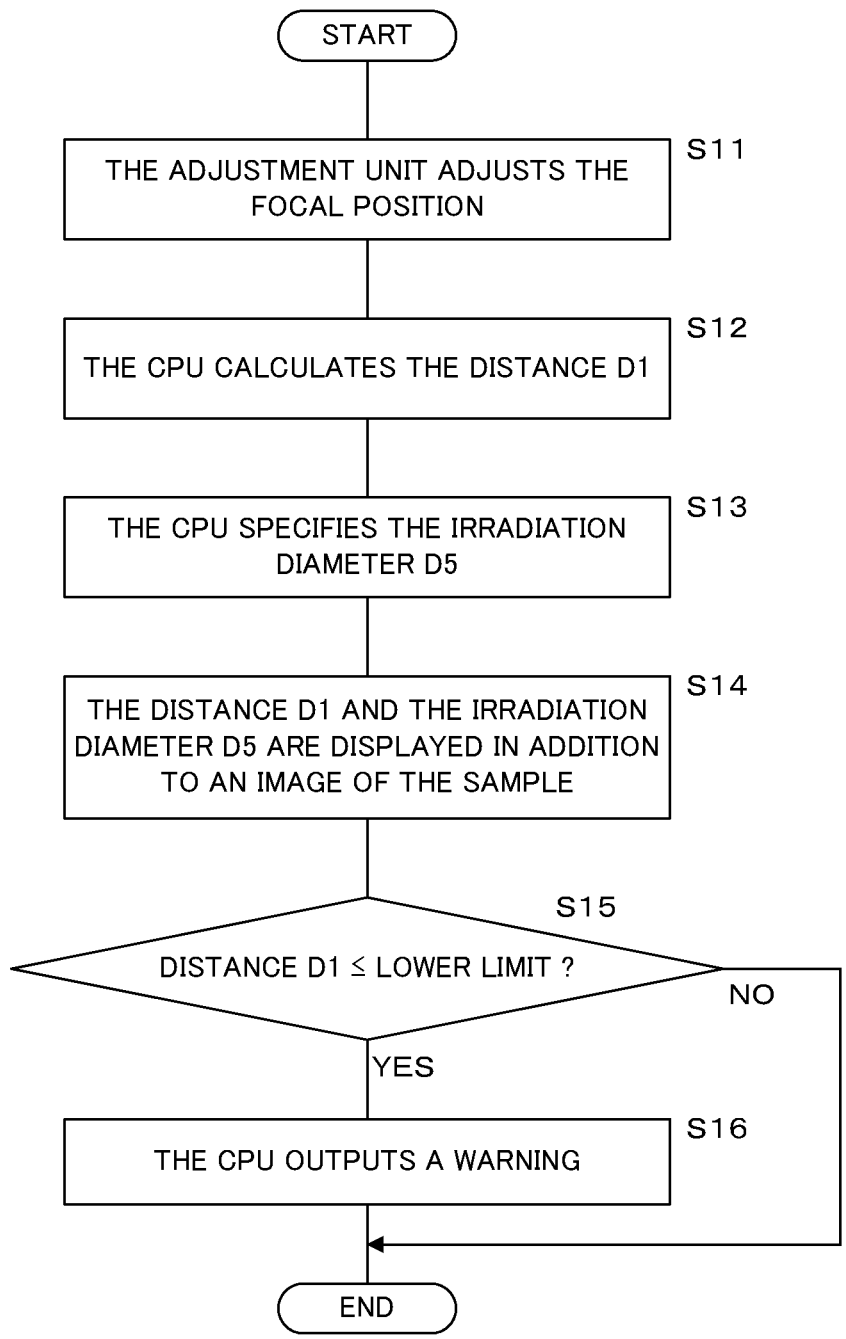
FIG. 5 is a flowchart illustrating the process procedures to be executed by an X-ray detection device according to Embodiment 1.

FIG. 5 is a flowchart illustrating the process procedures to be executed by an X-ray detection device according to Embodiment 1. The CPU 51 of the control unit 5 executes the following processing according to the computer program 541 loaded to the RAM 52. The sample stage 16 on which a sample 6 is mounted is positioned arbitrarily by the vertical actuator 45, and the optical microscope 15 photographs the sample 6. In general, the focus of the optical microscope 15 is not in an irradiated part, which is to be irradiated by X rays, of the sample 6. The adjustment unit 41 adjusts the focal position of the optical microscope 15 in a manner such that the focus is set in the irradiated part of the sample 6 (S11). With the process of S11, the focal position F1 of the optical microscope 15 of a state where the focus is set in the actual irradiated part of the sample 6 is set. The adjustment unit 41 automatically adjusts the focal position using an existing method. It is to be noted that adjustment of the focal position may be performed by displaying an image of the sample 6 photographed by the optical microscope 15 on the display unit 44 and allowing the user who views the image to operate the adjustment unit 41.

The CPU 51 specifies the distance D4 from the focal position F1 to the standard focal position F2, and calculates the distance D1 from the lower face of the window portion 21 to the irradiated part of the sample 6 based on the distance D4 and the standard distance D3 (S12). For example, the CPU 51 specifies the distance D4 by acquiring the distance the adjustment unit 41 moved the optical microscope 15 in the process of adjustment of the focal position from the adjustment unit 41 through the interface unit 56. For example, the distance of movement of the optical microscope 15 is expressed as a step number of a stepping motor, and the CPU 51 specifies the distance D4 by converting the step number into a length. Moreover, the CPU 51 calculates the distance D1 by subtracting the distance D4 from the standard distance D3 in a state where the distance D4 of a state where the focal position F1 comes close to the window portion 21 from the standard focal position F2 is set as a positive value and the distance D4 of a state where the focal position F1 comes further apart from the window portion 21 is set as a negative value. The value of the standard distance D3 is stored in advance in the storage unit 54. The CPU 51 may calculate the distance D1 from the distance D4 and the standard distance D3 using another calculation method.

Next, the CPU 51 specifies the X-ray irradiation diameter D5 on the sample 6 from the calculated distance D1 (S13). For example, the CPU 51 specifies the irradiation diameter D5 by reading an irradiation diameter D5 associated with the calculated distance D1 from the position table 542. Moreover, the CPU 51 specifies the X-ray irradiation diameter D5 on the sample by reading a plurality of irradiation diameters D5 associated with values before and after the calculated distance D1 from the position table 542 and interpolating the plurality of read irradiation diameters D5, for example. Moreover, the computer program 541 includes a function of a change of the diameter of X rays, and the CPU 51 specifies the X-ray irradiation diameter D5 on the sample 6 by interpolating a plurality of irradiation diameters D5 read from the position table 545 using the function, for example. The process of S13 corresponds to a size specification unit.

Figure 6:
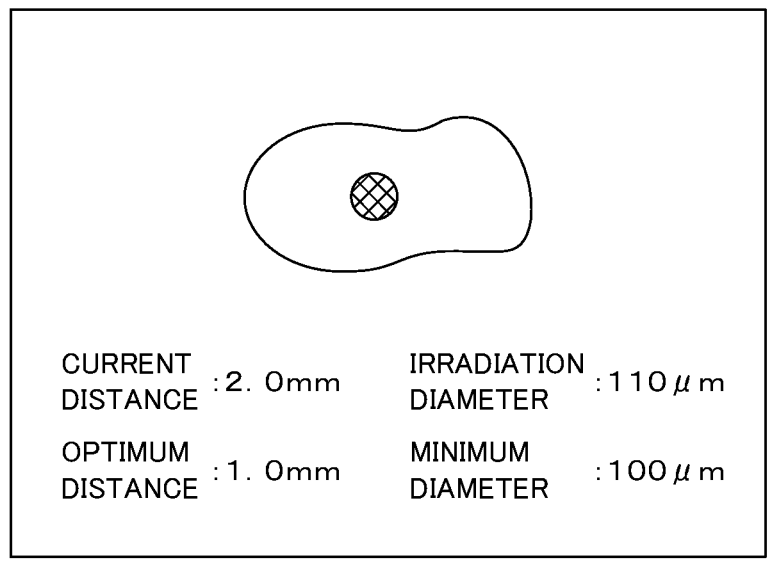
FIG. 6 is a schematic view illustrating an example of an image to be displayed by a display unit.

Next, the CPU 51 displays values of the calculated distance D1 and specified irradiation diameter D5 on the display unit 44 in addition to an image of the sample 6 photographed by the optical microscope 15 (S14). FIG. 6 is a schematic view illustrating an example of an image to be displayed by the display unit 44 over an image of the sample 6. The size of the extent of the irradiated part to be displayed is a size corresponding to the specified irradiation diameter D5. Moreover, the specified value of the irradiation diameter D5 and the calculated value of the current distance D1 are displayed. Furthermore, the CPU 51 causes the display unit 44 to display the optimum distance D2 and the minimum diameter that is the diameter of X rays of a state where X rays are converged to the minimum by the X-ray optical element 12. The user can check the current distance D1 from the lower face of the window portion 21 to the irradiated part of the sample 6, and an irradiation diameter D5 of a state where the sample 6 is irradiated with X rays in the current state. The user can also recognize a difference between the current distance D1 and the optimum distance D2 and check a difference between the irradiation diameter D5 and the minimum diameter. The display unit 44 may display an image indicating the extent of the irradiated part in a size depending on the current distance D1.

Next, the CPU 51 compares the calculated distance D1 and the lower limit 543, and determines whether the distance D1 is equal to or smaller than the lower limit 543 or not (S15). In a case where the distance D1 is over the lower limit 543 (S15: NO), the CPU 51 terminates the processing. In a case where the distance D1 is equal to or smaller than the lower limit 543 (S15: YES), the CPU 51 outputs a warning (S16) and terminates the processing. In S16, the CPU 51 causes the display unit 44 to display an image warning that the sample 6 is located too close to the window portion 21, for example. The control unit 5 may have an aspect to output a warning with voice. Moreover, the control unit 5 may perform a process of prohibiting air discharge for evacuating the inside of the vacuum chamber 2 and the sample chamber 3 in a case where the distance D1 is equal to or smaller than the lower limit 543. The process of S16 corresponds to a warning unit.

The processes of S11 to S16 allow the user to grasp the size of the irradiated part irradiated with X rays on the sample 6 by checking the distance D1 and the irradiation diameter D5. After the processes of S11 to S16 finish, the user inputs an instruction to change the position of the sample stage 16 to the input unit 55 as needed. In response to the inputted instruction, the control unit 5 controls the operation of the vertical actuator 45 and changes the position of the sample stage 16. The X-ray detection device repeats the processes of S11 to S16 and displays the values of the distance D1 and irradiation diameter D5 on the display unit 44. Adjustment of the distance D1 and the irradiation diameter D5 is performed in such a manner, and the user can adjust the position of the sample 6 so that a proper distance D1 and a proper irradiation diameter D5 are obtained. At least of the inside of the vacuum chamber 2 is evacuated in a state where a proper distance D1 and a proper irradiation diameter D5 are obtained, the sample 6 is irradiated with X rays, fluorescent X rays are detected, and an analysis is made.

Since the distance D1 and the optimum distance D2 are displayed on the display unit 44, the user can adjust the position of the sample 6 while checking the distance D1 and the optimum distance D2. The user can prevent the sample 6 from colliding with components of the X-ray detection device such as the window portion 21 by adjusting the position of the sample 6 in a manner such that the distance D1 does not become smaller than the optimum distance D2. Moreover, since an image indicating the extent of the irradiated part is displayed over the image of the sample 6, which specific part of the sample 6 is irradiated with X rays is displayed accurately. The user can accurately know at which part of the sample 6 fluorescent X rays to be detected by the detection unit 13 are generated by checking the displayed image.

Embodiment 2

Figure 7:
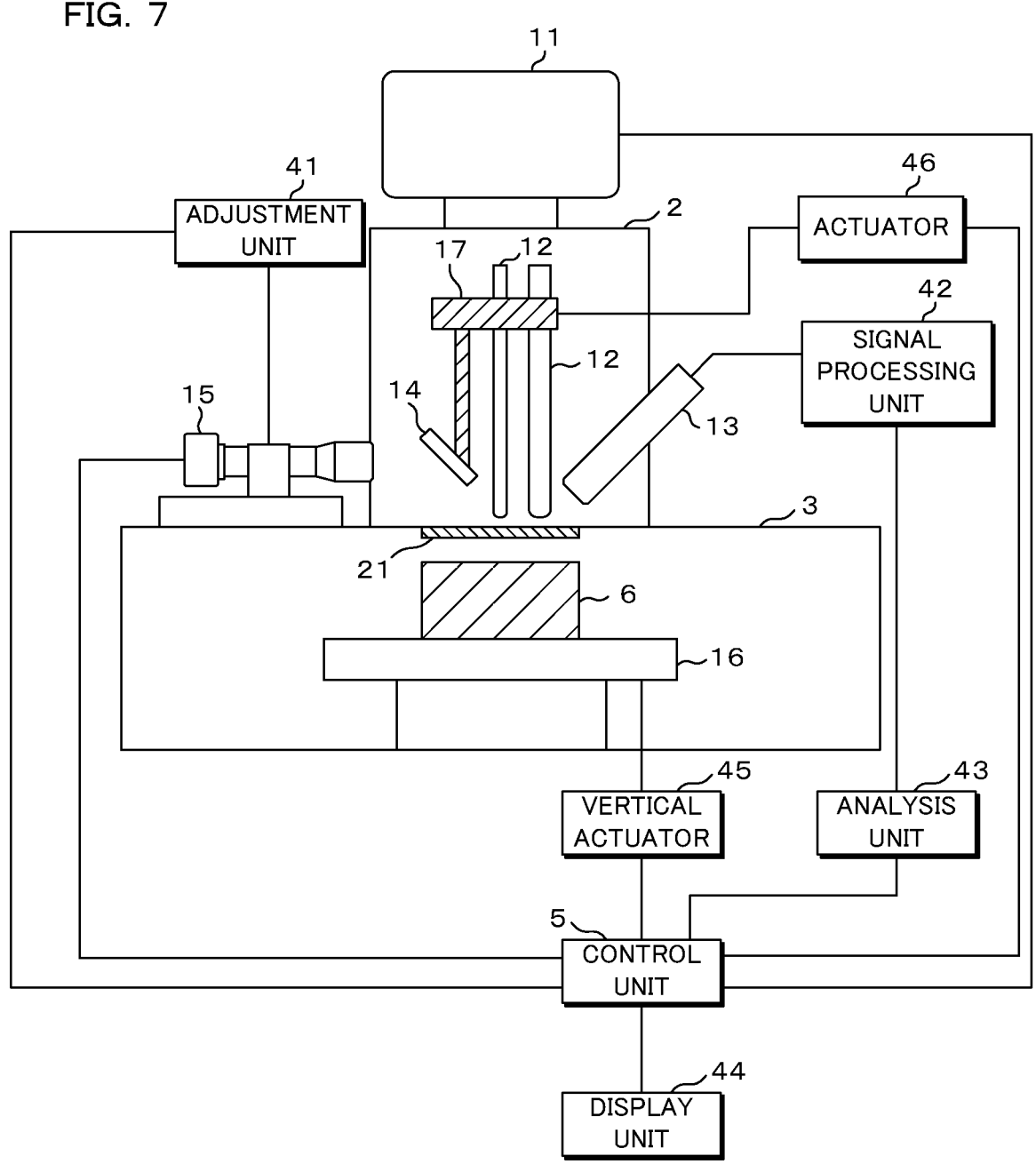
FIG. 7 is a block diagram illustrating the configuration of an X-ray detection device according to Embodiment 2.

FIG. 7 is a block diagram illustrating the configuration of an X-ray detection device according to Embodiment 2. The X-ray detection device is provided with a plurality of X-ray optical elements 12. The X-ray optical elements 12 correspond to a convergence unit. The plurality of X-ray optical elements 12 have different X-ray convergence diameters. The X-ray detection device is also provided with a switching stage 17 configured to switch an X-ray optical element 12 to be used for irradiation with X rays. The switching stage 17 is a stage that is provided with a plurality of X-ray optical elements 12 and can change the position of each X-ray optical element 12. Moreover, the switching stage 17 is provided with a mirror 14.

The switching stage 17 is coupled with an actuator 46 configured to move the switching stage 17. The actuator 46 is connected with a control unit 5. The control unit 5 controls the operation of the actuator 46. The switching stage 17 is actuated by the actuator 46 controlled by the control unit 5, and can cause any one of the plurality of X-ray optical elements 12 to be positioned at an irradiation position. The irradiation position is such a position that X rays from an X-ray source 11 enter and the sample 6 mounted on the sample stage 16 can be irradiated with X rays. In such a manner, an X-ray optical element 12 to be used for irradiation of the sample 6 with X rays is switched. By switching an X-ray optical element 12, the irradiation diameter of X rays to be used for irradiation of the sample 6 is changed, and the spatial resolution in a fluorescent X-ray analysis of the sample 6 can be changed.

Moreover, the switching stage 17 is actuated by the actuator 46 controlled by the control unit 5, and can position the mirror 14 at a photographing position. The photographing position is such a position of the mirror 14 that light reflected at an irradiated part, which is to be irradiated with X rays, of the sample 6 is reflected to enter the optical microscope 15.

The plurality of X-ray optical elements 12 have different minimum diameters of converged X rays. Moreover, the optimum distance D2 that is a distance from the lower face of the window portion 21 to a portion where the diameter of X rays is minimized depends on the X-ray optical element. The relation between the distance D1 from the lower face of the window portion 21 to the irradiated part of the sample 6 and the irradiation diameter D5 of X rays to be used for irradiation of the sample 6 also depends on the X-ray optical element 12. A position table 542 is preliminarily made for each X-ray optical element 12 and is stored in the storage unit 54. The configuration of the other part of the X-ray detection device is similar to Embodiment 1.

The X-ray detection device executes the processes of S11 to S16 in a state where the mirror 14 is positioned at the photographing position. The CPU 51 of the control unit 5 executes the processes of S12 to S14 using the position table 542 stored in the storage unit 54 for one X-ray optical element 12. In S14, an optimum distance D2, an irradiation diameter D5, and a minimum diameter related to one X-ray optical element 12 are displayed on the display unit 44. It is to be noted that the control unit 5 may execute the processes of S12 to S14 for a plurality of X-ray optical elements 12, and cause the display unit 44 to display optimum distances D2, irradiation diameters D5, and minimum diameters for each of the plurality of X-ray optical elements 12.

Adjustment of the distance D1 and the irradiation diameter D5 is performed as with Embodiment 1. When the user inputs an instruction to select an X-ray optical element 12 to the input unit 55, an X-ray optical element 12 to be used is selected. The control unit 5 controls the actuator 46 and positions the selected X-ray optical element 12 at the irradiation position. The sample 6 is irradiated with X rays, fluorescent X rays are detected, and an analysis is made.

Embodiment 3

Figure 8:
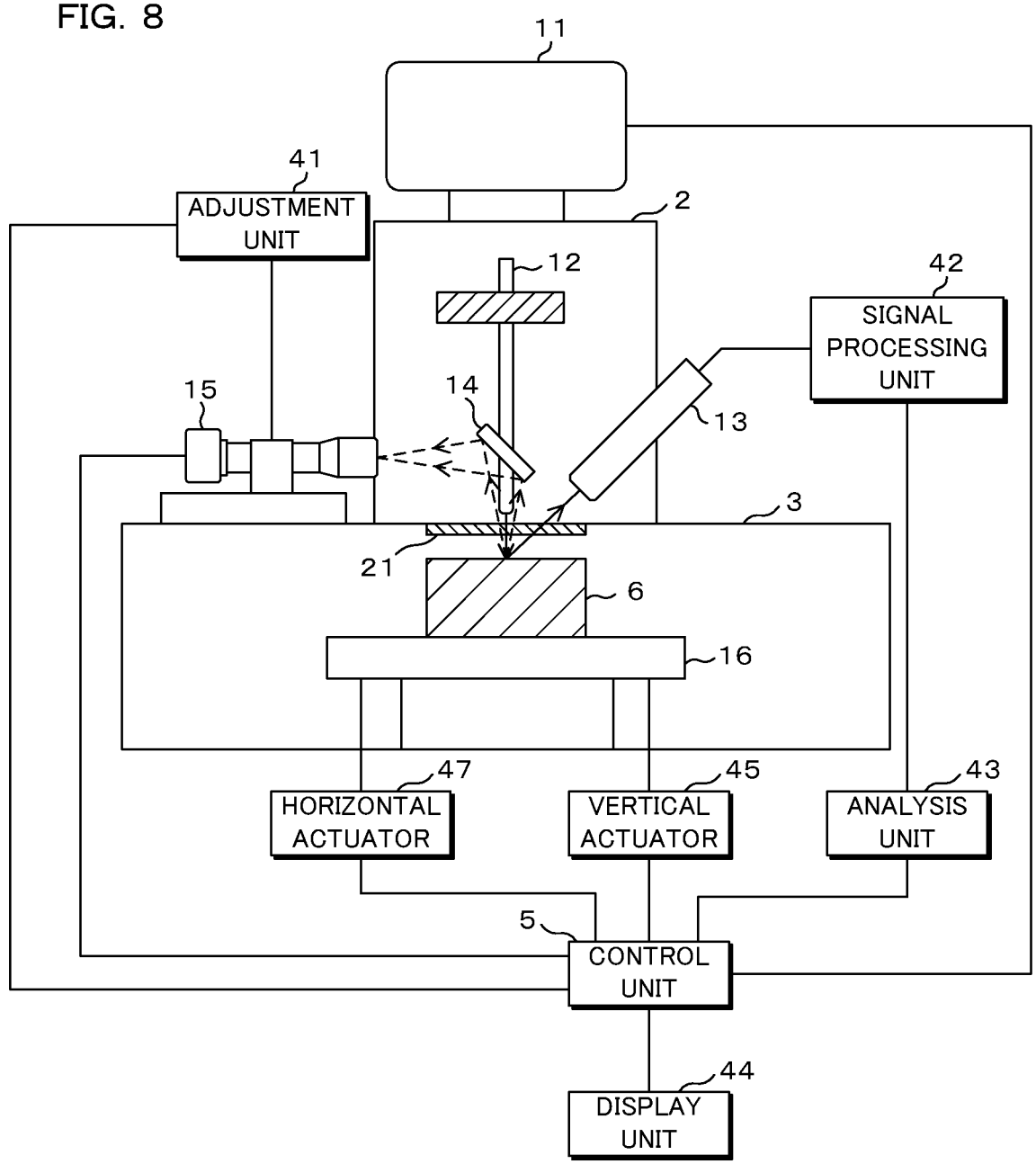
FIG. 8 is a block diagram illustrating the configuration of an X-ray detection device according to Embodiment 3.

FIG. 8 is a block diagram illustrating the configuration of an X-ray detection device according to Embodiment 3. A sample stage 16 is coupled with a horizontal actuator 47 configured to actuate the sample stage 16 in a horizontal direction, that is, a direction crossing the X-ray irradiation direction. The horizontal actuator 47 is constituted of a stepping motor, for example. The operation of the horizontal actuator 47 causes a sample 6 mounted on the sample stage 16 to move in a direction crossing the X-ray irradiation direction. The horizontal actuator 47 is connected with a control unit 5. The control unit 5 controls the operation of the horizontal actuator 47 so as to move the sample 6 mounted on the sample stage 16 and to change the position of the irradiated part, which is to be irradiated with X rays, on the sample 6. The configuration of the other part of the X-ray detection device is similar to Embodiment 1. It is to be noted that the X-ray detection device may have an aspect provided with a plurality of X-ray optical elements 12 as with Embodiment 2.

Figure 9:
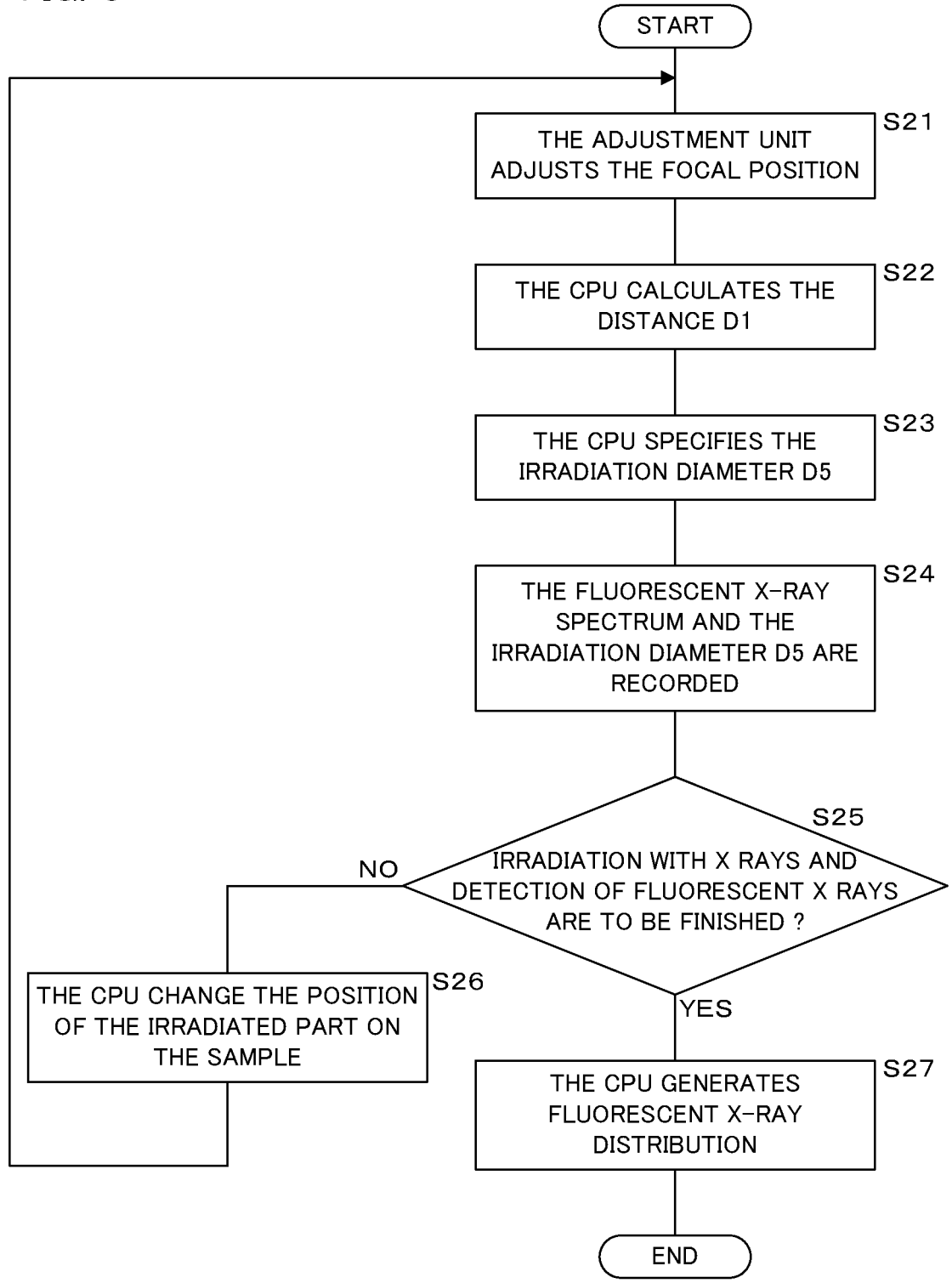
FIG. 9 is a flowchart illustrating the process procedures to be executed by an X-ray detection device according to Embodiment 3.

FIG. 9 is a flowchart illustrating the process procedures to be executed by an X-ray detection device according to Embodiment 3. The following processes are executed in a state where at least the vacuum chamber 2 is evacuated. The CPU 51 of the control unit 5 executes the following processes according to the computer program 541 loaded to the RAM 52. The optical microscope 15 photographs the sample 6, and the X-ray detection device executes the processes of S21 to S23 similar to the processes of S11 to S13. Next, the X-ray detection device irradiates the sample 6 with X rays, detects fluorescent X rays at the detection unit 13, and generates a fluorescent X-ray spectrum at the signal processing unit 42. The CPU 51 specifies the position of the irradiated part on the sample 6 from the position of the sample stage 16 controlled using the horizontal actuator 47. The CPU 51 acquires a fluorescent X-ray spectrum generated by the signal processing unit 42, and records the fluorescent X-ray spectrum and the specified irradiation diameter D5 in association with the position of the irradiated part (S24). Data in which a fluorescent X-ray spectrum and an irradiation diameter D5 are recorded in association with the position of the irradiated part is stored in the RAM 52 or the storage unit 54.

Next, the CPU 51 determines whether irradiation with X rays and detection of fluorescent X rays are to be finished or not (S25). For example, it is determined that irradiation with X rays and detection of fluorescent X rays are to be finished in a case where irradiation with X rays and detection of fluorescent X rays are performed for all parts in a specific extent on the sample 6. In a case where irradiation with X rays and detection of fluorescent X rays are not to be finished (S25: NO), the CPU 51 controls the operation of the horizontal actuator 47 through the interface unit 56 so as to move the sample 6 and change the position of the irradiated part on the sample 6 (S26). The horizontal actuator 47 and the process of S26 correspond to an irradiation position changing unit. Next, the X-ray detection device returns the processing to S21. The X-ray detection device repeats the processes of S21 to S26 so as to sequentially change the position of the irradiated part on the sample 6 and record a fluorescent X-ray spectrum and an irradiated diameter D5 in association with the position of the irradiated part every time the position of the irradiated part is changed. In the processes of S21 to S26, the position of the sample stage 16 in a direction toward or away from the window portion 21 is kept constant.

In a case where irradiation with X rays and detection of fluorescent X rays are to be finished in S25 (S25: YES), the CPU 51 generates fluorescent X-ray distribution in which a fluorescent X-ray spectrum and an irradiation diameter D5 recorded in association with the position of each irradiated part are associated with each part on the sample 6 corresponding to each irradiated part (S27). The CPU 51 stores data of the fluorescent X-ray distribution in the storage unit 54 and terminates the processing.

Recorded in fluorescent X-ray distribution generated in this embodiment is not only a fluorescent X-ray spectrum related to the composition of each part of the sample 6 but also an irradiation diameter D5 related to the spatial resolution in a fluorescent X-ray analysis at each part. Therefore, the composition of each part of the sample 6 is obtained, and the size of an extent irradiated with X rays in each part in an analysis of the composition is also obtained. It is to be noted that an X-ray detection device may make an elemental analysis at the analysis unit 43 and generate element distribution on the sample 6.

Moreover, an X-ray detection device in this embodiment may adjust the distance of movement corresponding to one step in movement of the sample 6 for obtaining fluorescent X-ray distribution depending on a specified X-ray irradiation diameter D5. For example, an X-ray detection device executes the processes of S11 to S16 so as to specify the X-ray irradiation diameter D5, and then sets the distance of movement corresponding to one step in movement of the sample 6 to a value depending on the irradiation diameter D5 such as a value equal to the irradiation diameter D5.

Moreover, for example, an X-ray detection device sets the distance of movement corresponding to one step in movement of the sample 6 in S26 to a value depending on the irradiation diameter D5 specified in S23. As the distance of movement corresponding to one step in movement of the sample 6 becomes smaller, the measuring time becomes longer though the spatial resolution becomes higher. Since the fineness limit of the spatial resolution is limited by the X-ray irradiation diameter D5, an effect of making the spatial resolution higher is not obtained even if the distance of movement corresponding to one step is made shorter than the irradiation diameter D5. The distance of movement corresponding to one step in movement of the sample 6 becomes the optimum value by making the distance of movement corresponding to one step to a value depending on the X-ray irradiation diameter D5. Fluorescent X-ray distribution having a spatial resolution as high as possible is obtained, and extending of a measuring time is further suppressed.

Although Embodiments 1 to 3 described above illustrate an aspect to calculate the distance D1 from the lower face of the window portion 21 to an irradiated part of the sample 6 according to a change in the focal position of the optical microscope, it is to be noted that an X-ray detection device may have an aspect to calculate the distance D1 using another method. For example, an X-ray detection device may have an aspect to measure the distance D1 using laser radiation. Moreover, an X-ray detection device may have an aspect that is not provided with an adjustment unit 41 configured to adjust the focal position of the optical microscope 15. In this embodiment, the X-ray detection device adjusts the position of the sample 6 with a vertical actuator 45 in a manner such that the focus of the optical microscope 15 is set on the surface of the sample 6, and then moves the sample 6 to an arbitrary position with the vertical actuator 45. Furthermore, the X-ray detection device calculates the distance D1 from the lower face of the window portion 21 to the irradiated part of the sample 6 depending on the distance that the vertical actuator 45 moved the sample 6 from the position where the focus of the optical microscope 15 is set on the surface of the sample 6.

Moreover, although Embodiments 1 to 3 illustrate an aspect to obtain the X-ray irradiation diameter as the size of an irradiated part on the sample 6, an X-ray detection device may have an aspect to obtain the X-ray irradiation area as the size of the irradiated part. Moreover, although Embodiments 1 to 3 illustrate an aspect to calculate the distance Dl from the lower face of the window portion 21 to the irradiated part of the sample 6 in a state where the lower face of the window portion 21 is set as a base point of distance, an X-ray detection device may have an aspect to set another part in the X-ray detection device as the base point of distance. The base point of distance is preferably located at any position along the central axis of X rays to be used for irradiation of the sample 6, or any position along the optical axis of light that is reflected at the sample 6 and enters the optical microscope 15. The base point of distance may be, for example, an X-ray exiting opening of the X-ray source 11, a tip of the X-ray optical element 12, or the mirror 14.

Moreover, although Embodiments 1 to 3 illustrate an energy dispersion type aspect to detect X rays by separating the X rays for each energy, an X-ray detection device may have a wavelength dispersion type aspect to detect X rays by separating the X rays for each wavelength. Moreover, although Embodiments 1 to 3 illustrate an aspect to irradiate a sample 6 with X rays and detect fluorescent X rays generated from the sample 6, an X-ray detection device may have an aspect to irradiate a sample 6 with radioactive rays other than X rays and detect characteristic X rays generated from the sample 6. Moreover, although Embodiments 1 to 3 illustrate an aspect in which a radiation detection device is an X-ray detection device, a radiation detection device may have an aspect to detect radioactive rays other than X rays at a detection unit 13. For example, a radiation detection device may have an aspect to irradiate a sample 6 with electron rays and detect secondary electrons generated from the sample 6 or reflection electrons at a detection unit 13.

The embodiments disclosed herein are illustrative in all aspects and should be considered not restrictive. The scope of the present invention is defined not by the above meanings but by the claims, and is intended to include all modifications within the scope and meanings equivalent to the claims.

It is to be noted that, as used herein and in the appended claims, the singular forms "a", "an", and "the" include plural referents unless the context clearly dictates otherwise.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

The invention claimed is:

1. A radiation detection device, comprising:
   a sample holding unit;
   an irradiation unit configured to irradiate a sample held by the sample holding unit with radioactive rays;
   a radiation detector configured to detect radioactive rays generated from the sample;
   a processor; and
   a display unit, wherein
   the processor calculates a distance from a predetermined base point to an irradiated part, which is to be irradiated with radioactive rays, of the sample held by the sample holding unit;
   the processor specifies a size of the irradiated part on the sample based on the calculated distance; and
   the display unit displays a value of the specified size of the irradiated part.

2. The radiation detection device according to claim 1, further comprising
   an optical microscope to be used for observation of the sample,
   wherein the display unit displays an observation image of the sample obtained with the optical microscope and an image indicating an extent of the irradiated part on the sample with one over the other.

3. The radiation detection device according to claim 2, further comprising
   an adjustment unit configured to adjust a focal position of the optical microscope to an adjusted focal position in a manner such that a focus is set in the irradiated part, wherein the processor calculates the distance from the predetermined base point to the irradiated part based on a standard distance from the predetermined base point to a standard focal position of the optical microscope to and a distance from the adjusted focal position to the standard focal position.

4. The radiation detection device according to claim 1, further comprising
   a distance changing unit configured to change a distance from the predetermined base point to the irradiated part,
   wherein the display unit displays the distance calculated by the processor, and such an optimum distance from the predetermined base point to the irradiated part that the size of the irradiated part is minimized.

5. The radiation detection device according to claim 1, wherein
   the processor outputs a warning in a case where the distance calculated by the processor is equal to or smaller than a preset lower limit.

6. The radiation detection device according to claim 1, further comprising
   a plurality of convergence units configured to converge radioactive rays to be used for irradiation of a sample into different diameters, wherein
   the processor specifies the size of the irradiated part according to one convergence unit selected from the plurality of convergence units.

7. The radiation detection device according to claim 1, further comprising:
   a horizontal actuator configured to actuate the sample holding unit, wherein
   the processor sequentially changes a position of the irradiated part on the sample by causing the horizontal actuator to move the sample holding unit, and
   the processor generates radiation distribution in which a detection result of radioactive rays and a size of the irradiated part are associated with each part on the sample.

8. A computer program capable of causing a computer to control a radiation detection device including radiation source configured to irradiate a sample with radioactive rays, a radiation detector configured to detect radioactive rays generated from the sample, an optical microscope to be used for observation of the sample, and a display unit, being capable of causing a computer to execute processing comprising:
   a step of calculating a distance from a predetermined base point in the radiation detection device to an irradiated part, which is to be irradiated with radioactive rays, of a sample depending on a distance from a standard position to a focal position of the optical microscope having a focus set in the irradiated part;
   a step of specifying a size of the irradiated part on the sample based on the calculated distance; and
   a step of causing the display unit to display a value of the specified size of the irradiated part.

9. The radiation detection device according to claim 1, wherein the display unit displays an image of the sample in addition to the value of the specified size of the irradiated part.

10. The radiation detection device according to claim 1, wherein the display unit displays a value of the calculated distance in addition to the value of the specified size of the irradiated part.

11. The radiation detection device according to claim 3, wherein the distance from the adjusted focal position to the standard focal position is based on a distance of movement of the optical microscope by the adjustment unit to adjust to the adjusted focal position.

* * * * *